Patented May 28, 1929.

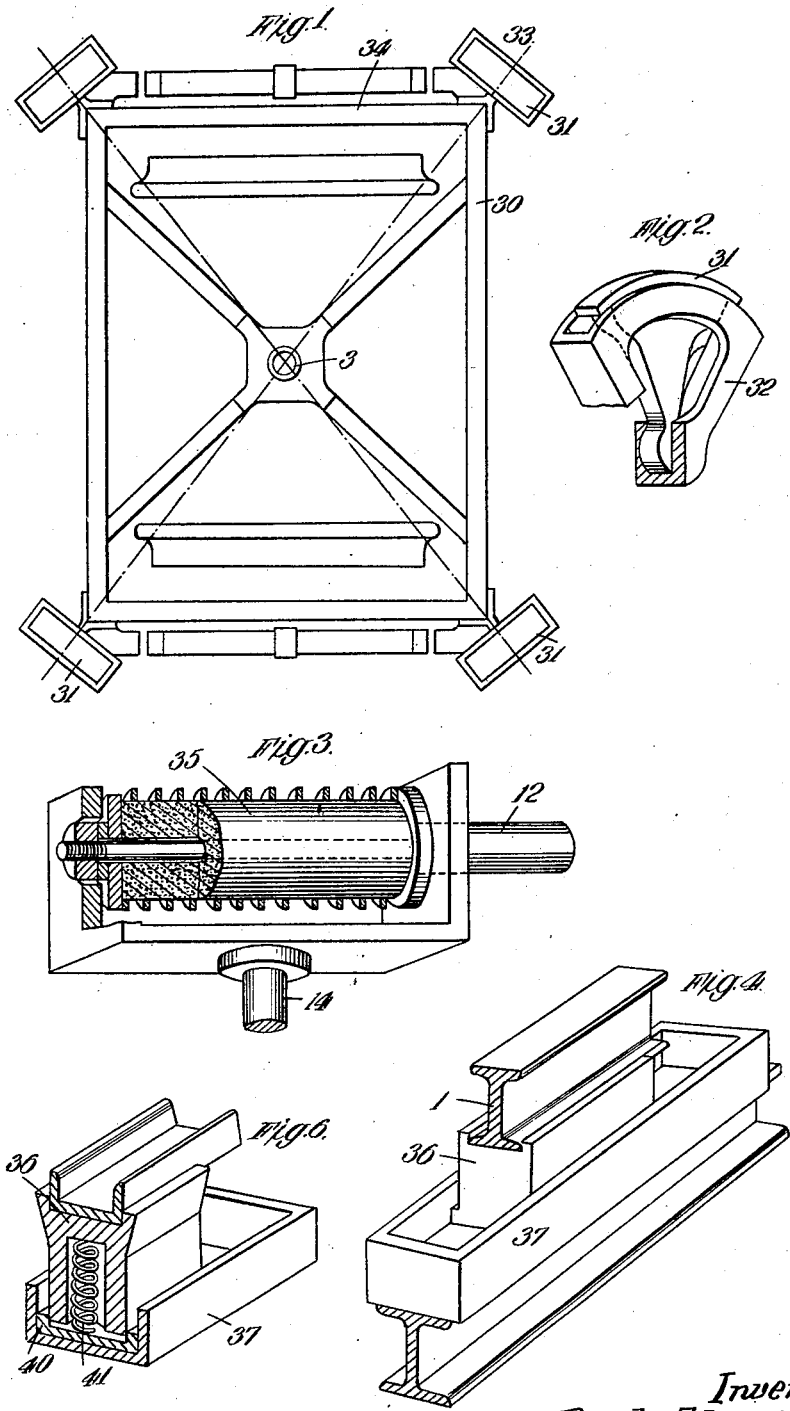

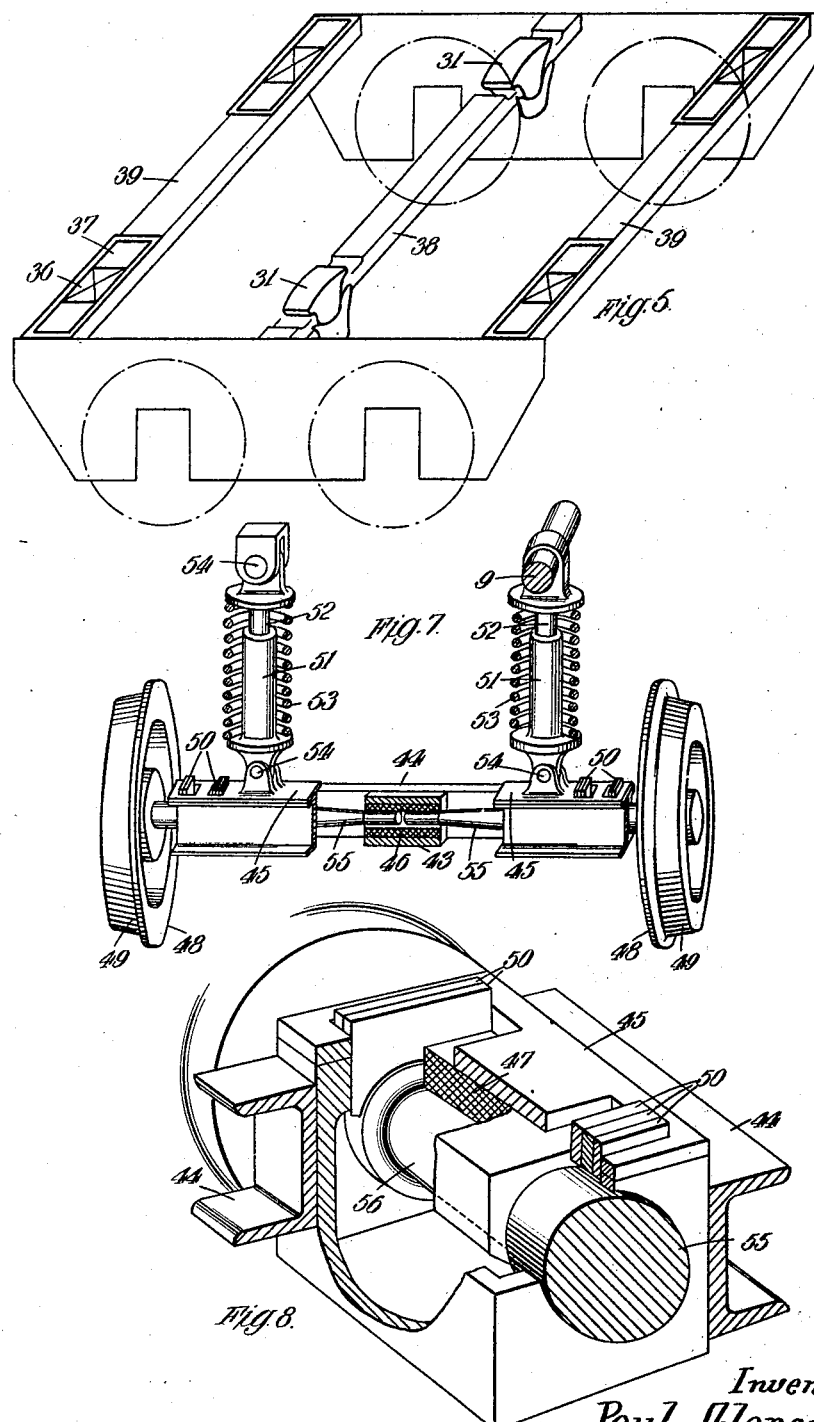

1,715,264

UNITED STATES PATENT OFFICE.

PAUL ALGRAIN, OF LA CROYERE, BELGIUM.

ROLLING STOCK OF RAILWAYS, TRAMWAYS, AND ROAD TRANSPORT VEHICLES.

Application filed January 10, 1928, Serial No. 245,739, and in Belgium March 25, 1927.

The present invention consists in improvements in or modifications of the rolling stock of railways or road transport vehicles.

In this specification, in order that the vehicle may traverse a curved path with the minimum of friction and wear of the rolling stock, trucks of the Bissell type are provided in which the angular displacements relatively to the main frame of the end trucks about vertical pivots, are controlled by one or more shafts to which an angular movement of rotation is imparted by the displacement of the central truck in a direction at right angles to the longitudinal axis of the chassis of the vehicle.

According to the present invention the angular movements of the end trucks are facilitated by supporting the frame on the end trucks by roller sectors pivoted in blocks of which the prolongations of the axes of rotation pass through the vertical pivots of the trucks. These blocks can advantageously be mounted at the ends of the sole bars of the end trucks.

Also, elastic damping devices can be interposed between the central truck and the shaft or shafts which control the angular displacements of the end trucks.

In order to lessen the resistance to the transverse displacement of the central truck, particularly in the case in which the latter comprises more than a single axle, the main frame is supported by sectors pivoting in blocks, provided in the frame of the truck, about axes parallel to the axis of the main frame, and by blocks sliding in guides provided in the truck, elastic means being inserted between the shoes of the blocks and the guides in order to limit the friction.

If the vehicle is supported only by the two end trucks, the function of the central truck is limited to control the angular movements of the end trucks. In this case springs or other elastic devices are inserted between the central truck and the frame of the vehicle to keep the truck on the rail. These springs or the like are mounted on extensible and jointed supports. One of these supports may connect the central truck to the mechanical connection ensuring the radial arrangement of the axles when the vehicle is traversing a curve.

The axle of the central truck can be made in two parts assembled so as to take up any play produced by wear of the flanges of the wheels.

The figures of the accompanying drawings illustrate examples of constructions according to the invention.

Fig. 1 is a diagrammatic plan of the frame of an end Bissell truck.

Fig. 2 is a perspective view of one of the sectors supporting the main frame.

Fig. 3 is a perspective view of an elastic medium interposed between the central truck and the rod effecting the angular movements of the end trucks.

Fig. 4 is a perspective view of one of the blocks supporting the main frame on the central truck.

Fig. 5 is a diagrammatic perspective view of the frame of a central truck with two axles supporting the frame of the vehicle by means of pivoted sectors and sliding blocks.

Fig. 6 shows in detail the sliding blocks of Fig. 5.

Fig. 7 is a perspective view of a central truck which in this case does not support the frame of the vehicle.

Fig. 8 shows the method of supporting the divided axles and means for adjusting their distance apart.

Figure 9:
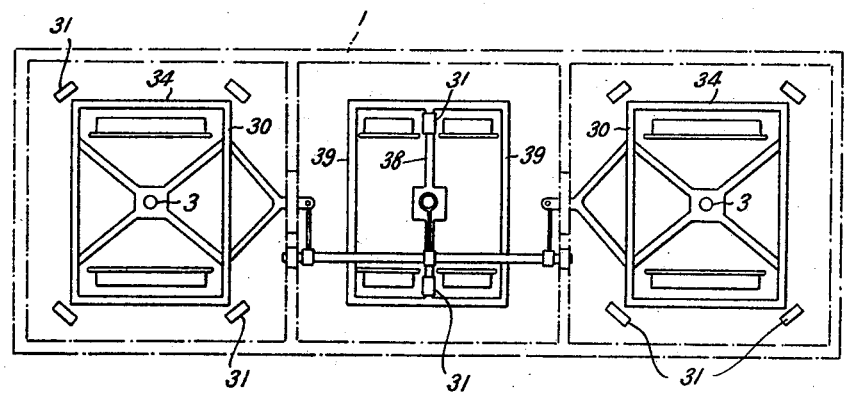
Figure 9 is a plan view showing the general arrangement of the three trucks.

In order to lessen the frictional resistance of the end trucks due to their angular movements when traversing curves, the frame 1 of the vehicle rests on roller sectors, such as 31 pivoting in blocks 32 provided in frames 30 of the end trucks. The axes 33 of these blocks pass through the vertical axis of the pivot 3 at the centre of the truck. This pivot is then only acted on by the horizontal reactions between the frame 1 and the truck. By this arrangement the frictional resistance on the pivot 3 is that due to rolling contact which decreases as the radius of the supporting sectors increases.

The supporting sectors can be mounted at the ends of the cross bars 34 of the frame 30. This gives greater stability and obviates reactions on the guide cheeks integral with the frame of the vehicle. The angular movements of the end trucks are also facilitated. The arrangement also obviates the use of cross members for transmitting the load and considerably reduces the weight of the frame.

It is evident that the number of supporting sectors may be varied, and that the axis of pivot 3 need not be at the centre of the truck.

In order to prevent slight transverse inequalities of the track, more particularly at places where the track apparatus is mounted, from giving rise to corresponding displacements of the central truck and, consequently, to slight angular displacements of the end trucks, an elastic damping device 35, consisting, for example, of a metallic spring or a block of caoutchouc, is interposed between the rod 12 which is articulated to the lever arm of the shaft controlling the angular displacements of the end trucks and the point 14 of the connection of this rod with the central truck.

When the central truck comprises more than one axle, the weight which is carried by it is generally such that the resistance to sliding of the blocks 36 in the guides 37 becomes too great in spite of the lubrication between the rubbing surfaces. In order to reduce this resistance, according to the invention the frame of the central truck carries, for example, a central transverse member 38, supporting sectors 31 and two lateral transverse rods 39 provided with guides 37 in which the blocks 36 slide. Shoes 40 (Fig. 6) on the blocks 36 are pressed on the guides 37 by springs 41 designed to produce a predetermined resistance to sliding and to absorb shocks.

In the case of motor vehicles, particularly tramway vehicles, it may be an advantage to have the total weight of the vehicle carried by the two end trucks. In this case the central truck ceases to be a supporting device and acts only to rotate the two end trucks by means of the mechanical connection uniting the three trucks.

If the axle of the central truck is formed of two divided axles 55 the wheels on these parts can rotate independently.

The free ends of the divided axles 55 are mounted in a box 43 which is secured, for example by bolts, to two cross bars 44, to which are also secured two boxes 45 enclosing bearings in which the divided axles rotate. The free ends of the axles engaging in the bearings 46 of the box 43 and the other ends 56 of the axles engaging in the bearings 47 of the boxes 45 are cylindrical.

As shown in the figures, the necks of the axle journals engage in the bearings 47 so that any axial displacement of the axle produces a corresponding displacement of the whole of the truck.

In order to prevent the wear of the flanges 48 of the wheels 49 from causing the central truck to "float" laterally, one result of which, among others, would be to impair the efficiency of the radial setting of the end trucks, the distance separating the divided axles can be varied so as to take up the play resulting from the said wear.

For this purpose as the wear takes place, a certain number of inserted metallic plates 50 can be displaced from the exterior towards the interior of the truck in the boxes 45.

The frame of the vehicle can be connected to the central truck by two extensible supports jointed at their ends 54. These supports comprise a cylinder 51 in which a piston 52 is displaceable and around which is disposed a spring 53 which ensures for each wheel a sufficient support on the rail to avoid its derailment. One of the supports can be rigid with a shaft 9, mechanically connected as illustrated and described in my copending application Ser. No. 220,194, filed September 17, 1927, and which consequently controls the rotation of the end trucks.

The play of the joints and the pistons provides sufficient flexibility to enable the truck to follow, not only sinuosities in the plane of the track, but also the vertical inequalities due either to the track or to the weight of the vehicle, while ensuring the control of the movement of the end trucks.

Having thus described the nature of the said invention and the best means I know of carrying the same into practical effect, I claim:—

1. Rolling stock of railways, tramways, and road transport comprising a main vehicle frame, a central Bissell truck and end Bissell trucks, frames for said end trucks, blocks rigidly secured to said end truck frames and roller sectors pivoted in said blocks supporting said main vehicle frame.

2. Rolling stock of railways, tramways and road transport comprising a main vehicle frame, a central Bissell truck and end Bissell trucks, frames for said end trucks, cross bars forming part of said end truck frames, blocks rigidly secured to the ends of said cross bars and roller sectors pivoted in said blocks supporting said main vehicle frame.

3. Rolling stock of railways, tramways and road transport, comprising a main vehicle frame, a central Bissell truck and end Bissell trucks, frames for said end trucks, a vertical pivot on each end truck about which said truck can rotate, blocks rigidly secured to said end truck frames and roller sectors pivoted on said blocks, the prolonged pivoting axes of said sectors passing through the said vertical pivots.

4. Rolling stock of railways, tramways and road transport comprising a main vehicle frame, a central Bissell truck and end Bissell trucks, frames for said end trucks, cross bars forming part of said end truck frames, blocks rigidly secured to the ends of said cross bars and roller sectors pivoted in said blocks supporting said main vehicle frame, a vertical pivot on each end truck, about which said truck can rotate, the prolonged axes of said sectors passing through the said vertical transport.

5. Rolling stock of railways, tramways and road transport, comprising a main vehicle frame, a central Bissell truck and end Bissell trucks, frames for said end trucks, blocks rigidly secured to said frames and roller sectors pivoted in said blocks supporting said main vehicle frame, a frame for said central truck, blocks in said last mentioned frame, roller sectors pivoted in the blocks provided in said central truck about axes parallel to the axis of the main vehicle frame.

6. Rolling stock of railways, tramways and road transport comprising a main vehicle frame, a central Bissell truck, end Bissell trucks, frames for said end trucks, blocks rigidly secured to said end truck frames and roller sectors pivoted in said blocks, a frame for said central truck, blocks guided in said last mentioned frame, roller sectors pivoted in the blocks provided in said central truck about axes parallel to the axis of the main vehicle frame.

7. Rolling stock of railways, tramways and road transport, comprising a main vehicle frame, a central Bissell truck and end Bissell trucks, frames for said end trucks, blocks rigidly secured to said end truck frames and roller sectors pivoted in said blocks supporting said main vehicle frame, a frame for said central truck, blocks in said last mentioned frame, guides for and shoes on said blocks of said central truck, an elastic medium interposed between said guides and shoes and roller sectors pivoted in the blocks provided in said central truck about axes parallel to the axis of said main vehicle frame.

8. Rolling stock of railways, tramways and road transport, comprising a main vehicle frame, a central Bissell truck, and end Bissell trucks, frames for said end trucks, blocks rigidly secured to said frames and roller sectors pivoted in said blocks supporting said main vehicle frame, a frame for said central truck blocks in said last mentioned frame, roller sectors pivoted in the blocks provided in said central truck about axes parallel to the axis of the main vehicle frame, and elastic devices inserted between the central truck and said main vehicle frame.

9. Rolling stock of railways, tramways and road transport comprising a main vehicle frame, a central Bissell truck and end Bissell trucks, frames for said end trucks, blocks rigidly secured to said end truck frames and roller sectors pivoted in said blocks, a frame for said central truck, blocks in said last-mentioned frame, roller sectors in said blocks, provided in said central truck pivoted about axes parallel to the axis of the main vehicle frame, elastic devices inserted between the central truck and said main vehicle frame and extensible and jointed members supporting said elastic devices.

10. Rolling stock of railways, tramways and road transport, comprising a main vehicle frame, a central Bissell truck and end Bissell trucks, frames for said end trucks, blocks rigidly secured to said frames and roller sectors pivoted in said blocks supporting said main vehicle frame, a frame for said central truck, blocks in said last-mentioned frame, roller sectors pivoted in the blocks provided in said central truck about axes parallel to the axis of the main vehicle frame, elastic devices inserted between the central truck and the frame of the vehicle and extensible and jointed members supporting said elastic devices, each of said extensible members comprising a cylinder and a piston vertically displaceable therein.

11. Rolling stock of railways, tramways and road transport, comprising a main vehicle frame, a central Bissell truck and end Bissell trucks, frames for said end trucks, blocks rigidly secured to said frames and roller sectors pivoted in said blocks supporting said main vehicle frame, an axle for said central truck formed in two parts and means for varying the longitudinal distance apart of said parts.

12. Rolling stock of railways, tramways and road transport, comprising a main vehicle frame, a central Bissell truck and end Bissell trucks, frames for said end trucks, blocks rigidly secured to said frames and roller sectors pivoted in said blocks supporting said main vehicle frame, an axle for said central truck formed in two parts, a central bearing and end bearings for each axle part and removable metallic plates inserted between said end bearings and said axle parts.

In testimony whereof I have signed my name to this specification.

PAUL ALGRAIN.